UNITED STATES PATENT OFFICE.

WILLIAM G. O'BRIEN, OF AKRON, OHIO.

ART OF COMPOUNDING RUBBER.

1,400,231.  Specification of Letters Patent.  Patented Dec. 13, 1921.

No Drawing.  Application filed May 22, 1919. Serial No. 299,011.

*To all whom it may concern:*

Be it known that I, WILLIAM G. O'BRIEN, a citizen of the United States, residing at Akron, in the county of Summit and State of Ohio, have invented a new and useful Improvement in Art of Compounding Rubber, of which the following is a specification.

The present invention relates to the art of compounding rubber, and is fully set forth in the following specification.

In the manufacture of rubber products, the quality of the resulting material is to a considerable extent determined by the homogeneity of admixture of the compounding ingredients. Mere uniformity of admixture is found to be insufficient to produce a high quality product, as the character of the vulcanization reaction, particularly in the presence of accelerators and fillers, is such that a high degree of dispersion of the reacting and filling materials within each other is essential. If the ingredients are not uniformly distributed or admixed, or if the ingredients or any of them are in a coarse state of dispersion, a lack of uniformity in vulcanization and in the product become apparent and a poorer quality of product results.

In the patent to Robert C. Hartong, No. 1,301,693, dated April 22, 1919, there is described and claimed the homogeneous product resulting from the admixture of glue with rubber and subsequent vulcanization of the dried product. In that application there is furthermore disclosed a process for producing this product wherein the glue is reduced to a plastic state such that it may be homogeneously admixed with plasticized rubber by the treatment of the glue with water sufficient to gelatinize it. It has now been found that glue, treated with or containing water in amount insufficient to gelatinize it at ordinary atmospheric temperature, for example, air dried glue, may be incorporated into rubber by a suitable mixing or milling process and with the formation of an intimate, homogeneous admixture substantially identical with that described in the Hartong patent. Air-dried glue, which may be utilized in accordance with the present invention, may contain from 5 to 15 per cent. of water, the average water content thereof being about 11%.

In accordance with the present invention, air-dried glue may be homogeneously admixed or compounded with rubber by subjecting a mixture containing the glue and unplasticized or unworked rubber to a mixing or milling action, whereby a relatively high temperature approaching or above the boiling point of water is produced or maintained, and continuing this mixing action at a controlled temperature for a period such that the quality of the resulting product is not endangered. The air-dried glue or like material is softened and plasticized before or simultaneously with the rubber and is uniformly distributed therethrough in an exceedingly fine state of dispersion, so fine as to result in a perfectly homogeneous product. The rubber at the time of admixture is in the unplasticized state; that is, it is unworked or has not been worked to a state of entire plasticity and will not flow to a sufficient extent to incorporate the unplasticized glue particles as such. As a further result of the conditions under which this mixing action is effected, the water present in the batch, which is substantially completely volatized, escapes during the mixing process or subsequently with a notable expansion of the mass, and the resulting mixture is of sufficiently low water content that it may be cured without further drying after admixture with suitable vulcanizing agents.

To illustrate more particularly the process of the present invention, the following specific example may be described: Into the jacketed container of a mixing or milling device capable of exerting a kneading and tearing action, such as those known as Werner and Pfleiderer or Banbury mixers, about 70 parts of rubber and about 27.5 parts of commercial air-dried glue (equivalent to about 25 parts of water-free glue) are placed. While these ingredients are being added, the stirrer of the mixer is rotated and the materials are disintegrated, pulled apart and kneaded together in a vigorous mixing action. After the addition of the rubber and glue an additional 5 parts of rubber may be added, the mixing action being continued during this time. As a result of the tearing and kneading action the mass rapidly becomes heated, the temperature rising in a very short period to above the boiling point of water. The temperature continues to rise, and cooling water is circulated about the container, the temperature is not permitted to rise above 300° F. It is advantageous, however, that a temperature of about 280° F. be maintained. At this temperature it is found that a homogeneous mixture may be secured at the end of a period of 15 to 20 minutes, the shorter period being the time required when unsmoked rubber is utilized. If a lower temperature is uitilized, for example, 200° F., a longer period of mixing is necessary.

At the end of the mixing operation the batch is dumped and the resulting mass expands while the volatilized water contained therein escapes. The amount of water which remains in the mass on cooling is so small that further drying, *in vacuo*, or otherwise is unnecessary. Into the homogeneous mixture of rubber and glue thus produced, the remaining ingredients of the vulcanizing batch such as the sulfur and the accelerator and other ingredients may be incorporated by the usual methods, such as the ordinary differential rubber rolls. After compounding the mixture is vulcanized, producing a perfectly homogeneous vulcanized product.

It is readily apparent that the above proportions and the time and temperature factors are to be regarded only as illustrative of the present process. Thus with smoked rubber, a slightly longer period of mixing is necessary by reason of the tougher character of the rubber. In mixing the glue with the unplasticized or unworked rubber on the ordinary milling rolls a lower temperature may be used. It is desirable, however, that the temperature maintained be sufficient to effect a partial or complete vaporization of the water content of the glue and to substantially dry the mixture. The rubber may be placed upon the mill and worked sufficiently to cause it to adhere to the rolls, the glue being added before the rubber has become plastic. In the foregoing I have referred only to animal glue, but it will be understood that other animal or vegetable products of similar properties which are used like glue as constituents of rubber compounds may be handled in the same manner. Furthermore, although I have described my process in connection with the use of air-dried glue containing the percentage of water ordinarily present in a commercial product, I may also use glue containing lower percentages of water which are sufficient to cause the material to soften, gelatinize, or plasticize under the conditions secured by the present mixing process, and I further intend to include and may utilize glue containing a larger amount of water, for example, up to 20 to 25%, or such percentages of water as are insufficient to produce a gel at ordinary atmospheric temperatures such as that described in the patent to Hartong, No. 1,301,693, previously referred to, which may be incorporated with previously plasticized or broken-down rubber upon the rubber mixing rolls. In any case the present process results in a complete and perfect homogeneity of the product and a partial or complete drying thereof.

Although I have described specific methods whereby my invention may be carried out, and the results thereby produced, it will be clearly understood that the present invention is not limited by such specific details except in so far as such limitations are included within the terms of the accompanying claims.

I claim:

1. In the process of incorporating glue into a rubber compound, the improvement which consists in working the rubber to plasticize the same in the presence of glue containing water insufficient in amount to plasticize it at ordinary temperatures but sufficient to plasticize it in the working operation.

2. The process of incorporating glue into a rubber compound which consists in working water-containing glue with unplasticized rubber at a temperature sufficient to substantially dry the mixture.

3. The process of incorporating glue into a rubber compound which consists in subjecting glue containing 5 to 15% of water and unplasticized rubber to a mixing or milling action at a temperature sufficient to plasticize the glue.

4. The process of incorporating glue into a rubber compound which consists in subjecting glue containing 5 to 15% of water and unplasticized rubber to a mixing or milling action at a temperature sufficient to plasticize the glue and substantially dry the mixture.

5. In the process of incorporating glue into a rubber compound, the improvement which consists in working the rubber to plasticize the same in the presence of glue containing water insufficient in amount to plasticize it at ordinary temperatures but sufficient in amount to plasticize it in the working operation, the temperature of which is not permitted to exceed 300° F.

6. The process of incorporating glue into a rubber compound which consists in working water-containing glue with unplasticized rubber at a temperature sufficient to substantially dry the mixture and not above 300° F.

7. The process of incorporating glue into a rubber compound which consists in subjecting glue in the presence of 5 to 15% of water and unplasticized rubber to a mixing or milling action at a temperature of 200° F. to 300° F.

WILLIAM G. O'BRIEN.